Dec. 4, 1951  W. W. SLAGHT  2,577,692
UNIVERSAL COUPLING
Filed Feb. 18, 1947  2 SHEETS—SHEET 1

INVENTOR
William W. Slaght
BY Evans & McCoy
ATTORNEYS

Dec. 4, 1951   W. W. SLAGHT   2,577,692
UNIVERSAL COUPLING
Filed Feb. 18, 1947   2 SHEETS—SHEET 2

INVENTOR
William W. Slaght
BY Evans + McCoy
ATTORNEYS

Patented Dec. 4, 1951

2,577,692

UNITED STATES PATENT OFFICE 2,577,692

UNIVERSAL COUPLING

William W. Slaght, Rocky River, Ohio, assignor to Cleveland Steel Products Corporation, Cleveland, Ohio, a corporation of Ohio Application February 18, 1947, Serial No. 729,346

1 Claim. (Cl. 64—17)

This invention relates to universal joints and more particularly to joints of the type employed to connect sections of the longitudinal drive shaft extending to the rear axle of motor vehicles.

The main objects of the invention are to provide a joint which can be quickly and easily assembled and to provide a joint which can be manufactured at low cost.

More specifically it is an object of the invention to simplify the assembly by providing improved means for connecting the yoke to the spider, which is so constructed that the parts can be quickly and easily assembled, tightened and locked.

A further object of the invention is to reduce the cost of manufacturing the joint by providing yokes which are substantially identical and which can be readily forged with the same die and which are so formed that they require but little machining after the forging operation.

With the above and other objects in view, the invention may be said to comprise the universal joint as illustrated in the accompanying drawings, hereinafter described and particularly set forth in the appended claim, together with such variations and modifications thereof as will be apparent to one skilled in the art to which the invention pertains.

Reference should be had to the accompanying drawings forming a part of this specification, in which.

Figure 1:
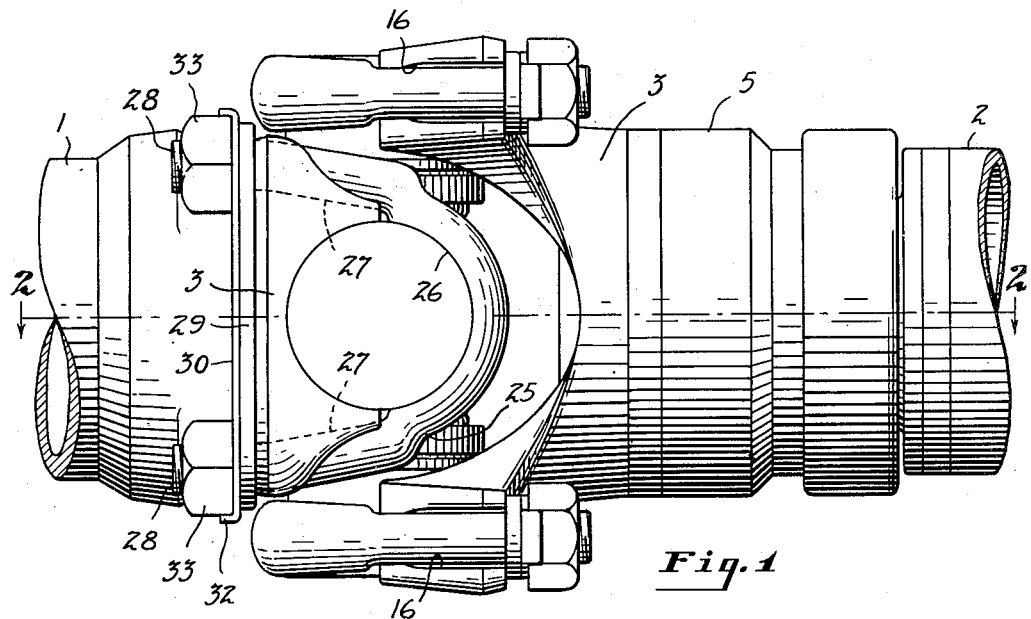
Figure 1 is a side elevation of a joint embodying the invention.
Figure 2:
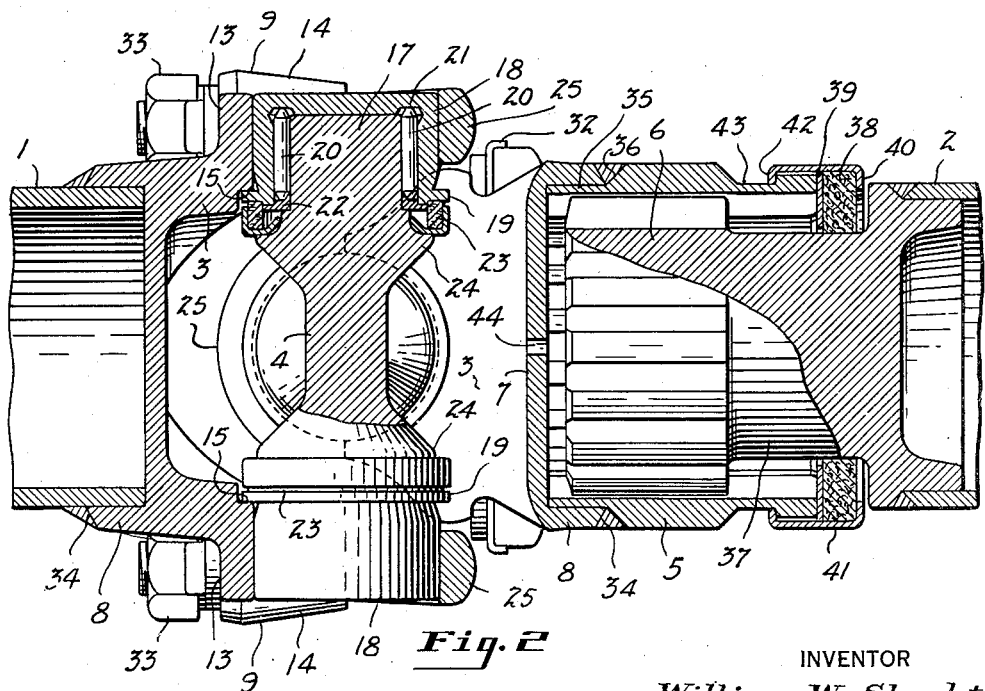
Fig. 2 is an axial section through the joint taken on the line indicated at 2—2 in Fig. 1.
Figure 3:
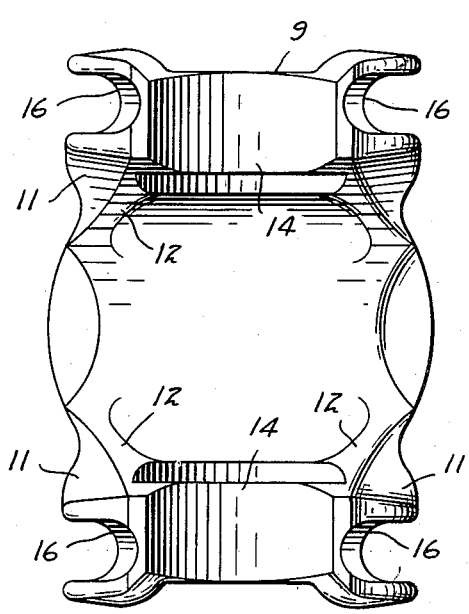
Fig. 3 is an elevation of one of the yokes looking toward the inner face thereof.
Figure 4:
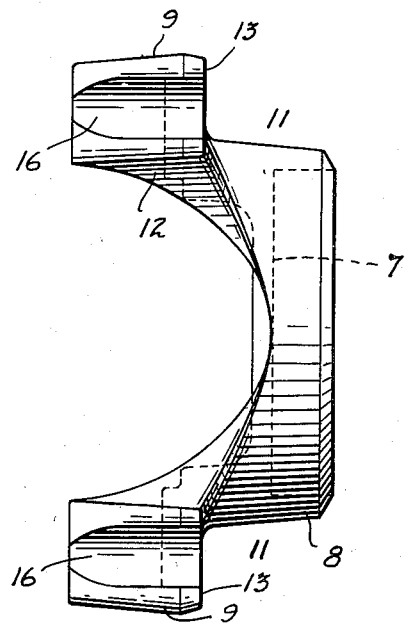
Fig. 4 is a side elevation of the yoke.
Figure 5:
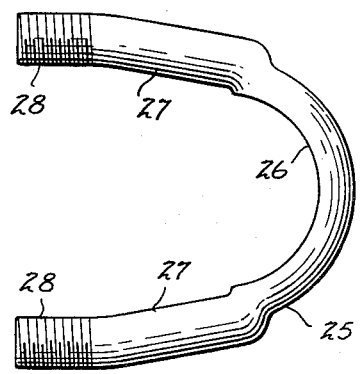
Fig. 5 is a plan view of the U-bolt employed for clamping the bearing thimbles to the yokes.
Figure 6:
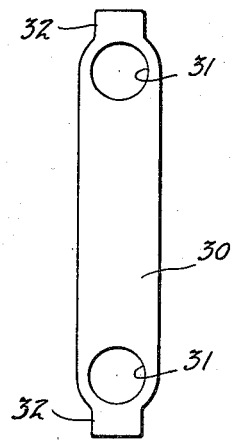
Fig. 6 is a plan view of the nut locking strip employed with the clamping bolts.

The joint of the present invention is shown between driving and driven shafts 1 and 2 and the main elements of the joint are two substantially identical yokes 3 and a spider 4 to which the yokes are pivotally connected. One of the yokes has a short tubular internally splined shaft section 5 attached thereto which receives a splined end portion 6 of the shaft 2. The telescopically splined connection permits relative longitudinal as well as angular relative movements between shafts 1 and 2.

Each of the yokes 3 has a flat web 7 of substantially circular form which is provided with a marginal flange 8 on the outer side thereof which provides a shaft receiving socket. On the inner side of the web 7 arms 9 are formed integrally with diametrically opposite portions of the web. The arms 9 extend axially and radially outwardly with respect to the web and are stiffened by means of integral triangular bracing webs or gussets 11 and 12 which connect the arm to the edge and inner face of the web.

The radially offset portion of each arm 9 is provided with a flat shoulder 13 which lies in a plane parallel to that of the web. Each arm has a concave recess 14 opening to its outer end, the recess being preferably substantially of semi-cylindrical form and the arm being provided with a flat shoulder 15 at the inner end of each recess.

On opposite sides thereof each of the arms is provided with bolt positioning channels 16 which extend axially. The channels 16 extend from the shoulders 13 to the outer ends of the arms on opposite sides of the recesses 14. The bottoms of the channels are preferably oppositely inclined and converge toward the outer ends of the arms.

The spider 4 has four radially disposed trunnions 17 which are equiangularly spaced. Each pair of axially alined trunnions is adapted to be positioned in the alined recesses 14 of the yoke arms and turns in bearing thimbles 18, which are formed to fit on the trunnions 17 and the recesses 14 of the yoke arms. The thimbles 18 are identical and each is provided with a circumferential outwardly extending flange 19 at its inner end which is adapted to engage with the shoulder 15 on the inner face of the arm in which it is mounted, so that the thimbles are positively held against endwise movement in the recesses 14.

The thimbles 18 have elongated bearing rollers 20 of small diameter which are interposed between the trunnion and the wall of the thimble. The bottom of the thimble is provided with an annular recess 21 to receive the adjacent pointed ends of the rollers that are retained in the thimble by a ring 22 that fits in the open end of the thimble for engaging the opposite ends of the rollers. In order to protect the thimble bearings against the entry of dirt and to retain lubricant in the bearings, a sealing ring 23 is mounted between the flange 19 of each of the thimbles and a circumferential shoulder 24 formed on the spider 4.

The bearing thimbles 18 are clamped to the arms 9 by means of identical U-bolts 25 each of which has an arched portion 26 that fits the cylindrical surface of the thimble and diverging arms 27 that fit in the inclined positioning channels 16 on the sides of the arms. The U-bolts 25 are provided with parallel threaded ends 28 which extend through a clamping plate 29 that is positioned against the shoulder 13 of the arm. A locking strip 30 is positioned on the outer face of the plate 29. The strip 30 has holes 31 to receive the bolt ends 28 and nuts 33 are tightened against the strip 30 to clamp the thimbles. When the nuts have been tightened the tabs 32 at the ends of the strip 30 can be quickly and easily bent up against the nut to lock the same by striking them with a hammer.

The flanges 8 of the yokes have beveled outer ends 34 which facilitate the joining of the yoke to a shaft by welding. The shaft 1 may be fitted within the flange 8 and permanently secured to the yoke by means of welding metal deposited on the beveled end 34 of the flange and the adjoining surface of the shaft.

The short tubular shaft section 5 has a reduced inner end 35 that fits within the flange 8 and at the end of the reduced portion is provided with a beveled shoulder 36 so that a V-shaped groove is formed by the opposed beveled faces 34 and 36 in which welding metal may be deposited.

Outwardly of its splined end portion 6 the shaft 2 has a portion 37 of reduced diameter which is engaged by a sealing ring 38 that is secured to the outer end of the tubular shaft section 5. The sealing ring is clamped between an annular disk 39 seated against the end of the tube 5 and a flange 40 on the outer end of a retaining sleeve 41 that fits upon the outer end of the tubular shaft 5 and which is retained on the shaft 5 by tabs 42 bent over into a groove 43 forming the shaft.

By employing a short tubular shaft 5 in which the internal splines can be readily formed prior to attachment of the shaft to the yoke, the yoke carrying the spline may be identical with the other yoke of the joint and both yokes may be formed by a simple forging operation.

A small hole 44 is preferably formed in the web of the yoke to which the splined shaft is connected so as to prevent the building up of fluid pressure between the end of the shaft and the web of the yoke.

By reason of the fact that the axial depth of each yoke is relatively small, the forging of the yokes is greatly simplified and the connections are such that only the simplest machining operations are required to finish the yokes.

By reason of the tapered form of the U-bolts and the inclined positioning channels, the bolts can be quickly and easily fitted into place, since the open end of the bolt will fit loosely into the channels and drop into engaging position.

It is to be understood that variations and modifications of the specific devices herein shown and described for purposes of illustration, may be made without departing from the spirit of the invention.

What I claim is:

A universal joint comprising a transverse web, an annular shaft-receiving flange projecting axially from one side of said web, and a pair of trunnion receiving arms projecting axially and outwardly in diametrically opposite directions from the opposite side of said web, said arms having diametrically alined open-sided trunnion receiving recesses in their ends, each of said arms providing an elongated flat shoulder parallel to said web between the plane thereof and the recess in the arm and having a pair of open-sided U-bolt positioning channels formed on diametrically opposite sides of the recess, said pair of channels diverging axially of said member in the direction of said shoulder and terminating at the ends thereof with the open sides of the channels facing outwardly from the ends of said shoulder and away from the recess, bearing thimbles positioned in said recesses, U-bolts having diverging legs straddling said thimbles and fitting into said positioning channels, said legs having threaded parallel end portions projecting beyond said shoulders, straps resting against said shoulders with apertures receiving the parallel ends of said U-bolts, and nuts on the parallel ends of said U-bolts bearing against said straps for drawing the U-bolts tightly over said thimbles.

WILLIAM W. SLAGHT.

REFERENCES CITED

The following references are of record in the file of this patent:

UNITED STATES PATENTS

| Number | Name | Date |
|---|---|---|
| 666,406 | Bocorselski | Jan. 22, 1901 |
| 1,973,702 | Cooke | Sept. 18, 1934 |
| 1,974,092 | Alsaker | Sept. 18, 1934 |
| 2,116,290 | Spicer | May 3, 1938 |
| 2,171,313 | Pearce | Aug. 29, 1939 |
| 2,353,299 | Dunn | July 11, 1944 |